(12) United States Patent
Lund et al.

(10) Patent No.: US 6,293,700 B1
(45) Date of Patent: Sep. 25, 2001

(54) CALIBRATED ISOTHERMAL ASSEMBLY FOR A THERMOCOUPLE THERMOMETER

(75) Inventors: John M. Lund, Marysville; Jonathan J. Parle, Seattle; Monte R. Washburn, Bothell, all of WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 09/404,921

(22) Filed: Sep. 24, 1999

(51) Int. Cl.[7] .................................. G01K 7/02; G01K 7/12
(52) U.S. Cl. .................................. 374/181; 374/182
(58) Field of Search .................... 374/181, 182, 374/178; 136/230, 229, 242

(56) References Cited

U.S. PATENT DOCUMENTS

| | | | |
|---|---|---|---|
| 4,130,019 | * 12/1978 | Nitschke | 374/110 |
| 4,133,700 | * 1/1979 | Hollander et al. | 374/181 |
| 4,157,663 | * 6/1979 | Ihlenfeldt et al. | 374/181 |
| 4,403,296 | * 9/1983 | Prosky | 374/181 |
| 4,718,777 | 1/1988 | Mydynski et al. . | |
| 4,776,706 | * 10/1988 | Loiterman et al. | 374/208 |
| 4,936,690 | * 6/1990 | Goetzinger | 374/181 |
| 5,090,918 | 2/1992 | Zoellick et al. . | |
| 5,161,893 | * 11/1992 | Shigezawa et al. | 374/181 |
| 5,167,519 | * 12/1992 | Jones et al. | 439/259 |
| 5,246,293 | * 9/1993 | Luotsinen et al. | 374/181 |
| 5,328,264 | * 7/1994 | Krencker et al. | 374/182 |
| 5,492,482 | 2/1996 | Lockman et al. . | |
| 6,045,260 | * 4/2000 | Schwartz et al. | 374/183 |
| 6,068,400 | * 5/2000 | Nelson et al. | 374/179 |

* cited by examiner

Primary Examiner—Diego Gutierrez
Assistant Examiner—Lydia M. De Jesús
(74) Attorney, Agent, or Firm—George T. Noe

(57) ABSTRACT

A calibrated isothermal assembly for a thermocouple thermometer is provided to obviate a calibration step after manufacture of the instrument. A compact isothermal block is fabricated on a specialized printed circuit board which includes a thick metal plate to establish sufficient thermal mass and good heat conductivity. A temperature sensor is mounted at the thermocouple reference junction on the printed circuit board to track the reference junction temperature. The calibrated isothermal assembly also includes a current source for the temperature sensor, and a memory device containing stored calibration data specific to the temperature sensor.

11 Claims, 2 Drawing Sheets

CALIBRATED ISOTHERMAL ASSEMBLY FOR A THERMOCOUPLE THERMOMETER

BACKGROUND OF THE INVENTION

This invention relates generally to thermocouple thermometers, and in particular to a method and apparatus for providing a calibrated isothermal assembly for a thermocouple thermometer.

It is well known in the art that a thermocouple is a pair of conductors composed of dissimilar metals and so joined at two points that a voltage is developed by the thermoelectric effects at the two junctions. Different types of metals joined together produce different thermoelectric effects, and so different types of thermocouples are commercially available, and have been for many years, for measuring different ranges of temperatures. The voltage-versus-temperature relationship of a thermocouple is nonlinear; and accurate voltage-versus-temperature tables are available for each of the various types of thermocouples. These tables were originally derived by making one of the two junctions a reference junction and placing it in an ice bath to keep the reference junction at the ice point while measuring the voltage at the other junction over a range of temperatures. Some common types of thermocouple are the type J (iron-constantan), the type K (chromel-alumel), and the type T (copper-constantan). These thermocouples are manufactured with a measuring junction at a free end for measuring temperatures, and a plug end for connecting to a measuring instrument and forming a reference junction.

Thermocouple thermometers are digital electronic instruments into which a thermocouple is plugged. The instruments typically permit selection of the thermocouple type, and include circuitry for measuring the thermocouple voltage. Conventional thermocouple thermometers also include display devices, such as liquid crystal display (LCD) devices, on which temperatures are read out in numerical characters.

The interface at which the thermocouple is plugged into the instrument is critical to the system because it is the reference junction for the thermocouple. U.S. Pat. No. 4,718,777 teaches the use of an isothermal block formed of alumina ceramic of sufficient mass and good heat conductivity to maintain stable, substantially equal temperatures at two conductive connector pads mounted inside the block where the pair of thermocouple wires plug into the instrument. A temperature sensor with a nearly linear volt-equivalent of temperature mounted inside the isothermal block between the connector pads measures the temperature of the isothermal block to compensate the output reading for error created by the reference junction. This is achieved by the instrument controller retrieving from a lookup table an error correction voltage corresponding to the measured temperature of the reference junction, and subtracting it from the voltage created by the thermocouple.

In the past, the method of calibrating the reference junction was to place the thermocouple in a lag bath at a stabilized temperature, such as room temperature, along with a mercury thermometer after the electronic thermometer instrument was manufactured. After the mercury thermometer became stabilized, the person calibrating the reference junction would, while observing the electronic thermometer's display, adjust the bias current to the temperature sensor by turning a potentiometer until the display matched the reading on the mercury thermometer. Because the temperature sensor, usually a temperature-sensing transistor, was specified with a nearly linear volt-equivalent of temperature over a temperature-measuring range and thus operated nearly linearly over a volts-versus-temperature range that was available in a lookup table, calibration was carried out at only one temperature. That is, since the voltage-equivalent of temperature of the base-emitter junction of the temperature-sensing transistor was nearly linear and specified by the manufacturer to a particular linearity tolerance, it was deemed that once calibrated at any stable temperature within the range of the thermocouple, the reference junction was calibrated for all temperatures.

The major disadvantage associated with the prior art method of calibration is that it was long and tedious, and had to be carried out after final assembly of the instrument. Each instrument had to be calibrated separately, and so the calibration times were cumulative in the manufacturing process, resulting slow, time-consuming and labor-intensive manufacture.

Another disadvantage was that because the tolerance of temperature sensors vary from part to part, even from the same manufacturer, the published tolerance specifications of the measuring instrument could be no better than the specifications published by the manufacturers of the temperature sensors.

It would be desirable to provide an isothermal thermocouple interface assembly and reference junction that could be calibrated before assembly into an instrument to obviate tedious and time-consuming calibration following manufacture of the instrument, or to permit field replacement of the interface without temperature calibration. To facilitate calibration of several isothermal assemblies at the same time, it would be desirable to make the physical size of the assembly as small as possible while still providing sufficient thermal mass and good thermal conductivity.

SUMMARY OF THE INVENTION

In accordance with the present invention, a thermocouple thermometer is provided with a calibrated isothermal assembly that provides the reference junction for a thermocouple, and that allows the thermometer to be assembled without the need for a later, time-consuming temperature calibration step. The calibrated isothermal assembly also permits field replacement without having to go through a step of temperature calibration.

The isothermal assembly is fabricated on base member comprising a specialized printed circuit board that provides a compact isothermal block, which includes a thick metal plate, such as copper or aluminum, to establish sufficient thermal mass and good heat conductivity. A pair of conductive pads are disposed in juxtaposition on the surface of a relatively thin insulative layer of the printed circuit board for wiping engagement with the blades of a thermocouple plug. A temperature sensor, which may suitably be a bipolar transistor having a linear volt-equivalent temperature characteristic, is mounted on the surface of the printed circuit board between the conductive pads. Also mounted on the base member is a memory device containing calibration data specific to the temperature sensor. The stored calibration data relates to one or more points and the slope of the line on the voltage-versus-temperature characteristic curve of the temperature-sensing transistor so that under operating conditions the measured sensor voltage can be translated directly into temperature of the reference junction. A current source for the temperature sensor is also preferably mounted on the base member.

Since an electronic assembly cannot be dropped in an ice bath for calibration, calibration in accordance with the preferred embodiment is carried out using a thermal air column into which several assemblies may be placed at the same time, and air of known temperatures is passed over the assemblies to bring the assemblies to the desired temperatures. In the preferred embodiment, an associated controller measures the temperature sensing transistor base-to-emitter voltage at two temperatures, and stores information relating to these voltage and temperature values as calibration data in the afore-mentioned memory device. Alternatively, if the slope of the temperature-sensing transistor is known or specified within close tolerances by a manufacturer, the temperature need be measured at only one point, which together with the slope information may be stored as calibration data. This alternative usually infers a more expensive sensor transistor, however. In either case, the calibration data then permits any sensor voltage in the sensor's dynamic operating range to be translated directly into reference junction temperature.

After the calibrated isothermal assembly is installed in an instrument and the instrument is operating, the temperature sensor tracks the temperature of the assembly over a range of operating temperatures specified for the instrument. When a temperature measurement is made, processing circuitry in the thermometer reads the output of the temperature-sensing transistor and obtains the calibration data from the memory device to determine the temperature of the reference junction. Once the reference junction temperature is known, the temperature at the measuring junction of the thermocouple can be determined using conventional techniques. The measured temperature is then provided as a reading on a display device.

It is therefore one object of the present invention to provide a novel calibrated isothermal assembly for a thermocouple thermometer.

It is another object of the present invention to provide a calibrated isothermal assembly for a thermocouple thermometer that obviates a calibration step after manufacture of the thermometer or after replacement of the isothermal assembly.

It is a further object of the present invention to provide a compact isothermal block for use in a thermocouple thermometer.

Other objects, features, and advantages of the present invention will become obvious to those having ordinary skill in the art upon a reading of the following description when taken in conjunction with the accompanying drawings.

DETAILED DESCRIPTION OF THE INVENTION

Figure 1:
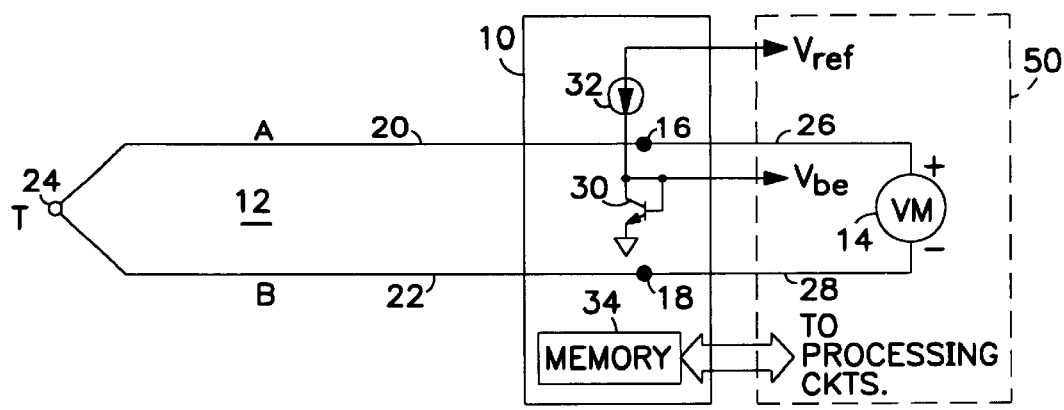
FIG. 1 is a schematic representation of a calibrated isothermal assembly to aid in understanding the present invention.

Referring to FIG. 1 of the drawings, there is shown a schematic representation of a calibrated isothermal assembly 10 for a thermocouple thermometer to aid in understanding the present invention. A thermocouple 12 and a voltmeter (VM) 14 are joined at junctions 16 and 18. Thermocouple 12 comprises wires 20 and 22, which are composed of dissimilar metals A and B joined at a measuring junction 24 at the free end of the thermocouple. Metals A and B are defined by the thermocouple type. Wires 26 and 28 connecting voltmeter 14 to junctions 16 and 18, respectively, may suitably be composed of copper (Cu).

As is well known in the art, so long as junctions 16 and 18 are maintained at the same temperature, which is the definition of isothermal, the voltages generated by the A-Cu and B-Cu junctions are in series opposition to each other. The effect is that the voltage $V_R$ across junctions 16 and 18 is as though it were generated by a junction of A and B at the reference junction's temperature, and thus the two junctions 16 and 18 become a virtual reference junction for thermocouple 12. Once the temperature of the virtual reference junction 16-18 is known, the temperature T at junction 24 may be determined for a given thermocouple type using conventional processes, such as using lookup tables or curve-fitting calculations in place of lookup tables.

Located between junctions 16 and 18 on isothermal assembly 10 is a temperature-sensing transistor 30, which may suitably be a commercially-available type 2N3904. As will be seen, calibration in accordance with the preferred embodiment permits the use of this relatively inexpensive part.

Also preferably included on the isothermal assembly 10 is a current source 32 to provide operating bias for temperature-sensing transistor 30, and a memory device 34 to store calibration data. Current source 32 may suitably be any of a number of conventional current sources. In the preferred embodiment, current source is a commercially available precision resistor chip operated by application of a predetermined reference voltage, $V_{REF}$, which in the preferred embodiment is +1.23 volts and is the same reference voltage used to operate the analog-to-digital converter in the thermometer instrument. Because the current generated by current sources may vary slightly from one current source to another simply due to their operating characteristics, the current source 32 is preferably located on the isothermal assembly 10 to ensure that the same level of current will always be provided to transistor 30 during thermometer operation. If the current source 32 is a high precision current source and accuracy from one component to another is within close tolerances, the current source could be located off the isothermal assembly.

Memory device 34 suitably may be an electronically-alterable read-only memory, such as a CMOS AT25010 EAROM. Once calibrated as will be discussed shortly, the isothermal assembly 10 is a complete unit including a thermocouple reference junction, a temperature-sensing transistor 30 with its own current source 32, and a memory device 34 containing calibration data specific to isothermal assembly 10. This permits the isothermal assembly 10 to be calibrated before it is ever installed in an instrument, and as such, may be used as a replacement part or moved to another thermometer instrument without recalibration.

Figure 2:
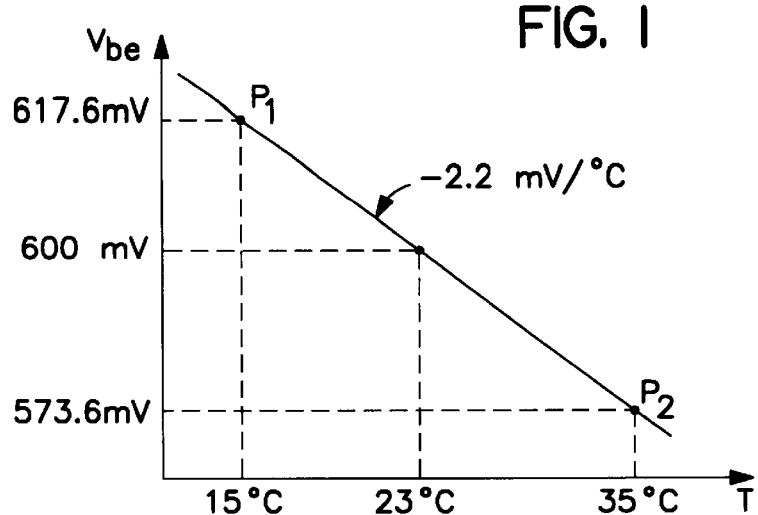
FIG. 2 is a an exemplary linear volt-equivalent of temperature curve for a temperature-sensing transistor.

FIG. 2 shows an exemplary voltage-versus-temperature characteristic curve for the base-to-emitter voltage ($V_{be}$) of temperature-sensing transistor 30. Since, as mentioned previously, a relatively inexpensive part is used for transistor 30, the slope of the linear characteristic curve may vary slightly from transistor to transistor. Therefore, the isothermal assembly 10 may be calibrated in accordance with the preferred embodiment of the present invention by measuring the temperature-sensing transistor $V_{be}$ at two different temperatures, or different points $P_1$ and $P_2$ on the linear characteristic curve shown in FIG. 2, to determine the slope of the line.

In the example shown in FIG. 2, the entire isothermal assembly 10 first is brought to a first predetermined temperature, such as 35° C., and the $V_{be}$ measured. Assume that the first measured value of $V_{be}$ at point $P_1$ is equal to 573.6 millivolts (mV) at 35° C. Next, the entire isothermal assembly 10 is brought to a second predetermined temperature, which is 15° C. in our example, and a value of $V_{be}$ at point $P_2$ equal to 617.6 mV is measured at 15° C. Now the calibration data at points $P_1$ and $P_2$ are known, and the slope of line connecting these points easily can be determined to be -2.2 mV/° C. The voltage at an intermediate temperature, for example, at 23° C., would be equal to 600 mV. From this example, it can be seen that the values of voltage and temperatures at points $P_1$ and $P_2$ may be stored in memory device as calibration data, or a known single point and the slope of line may be stored as calibration data. In the preferred embodiment, the stored calibration data is the voltage $V_{be}$ measured at a known intermediate temperature such as 23° C. and the slope of the line, e.g., -2.2 mV/° C. in our example. From this calibration data, any voltage $V_{be}$ generated by the temperature-sensing transistor 30 over its dynamic operating range may quickly be translated directly into a temperature of the reference junction.

It should be mentioned here that as an alternative embodiment, if temperature-sensing transistors are used in which the slope of the linear voltage-versus-temperature $V_{be}$ curve is known or specified by the manufacturer with any degree of certainty, a single point on the known linear characteristic curve may be determined by measuring $V_{be}$ at a predetermined temperature, for example, 23° C., and stored along with the known slope information as calibration data in memory device 34.

Use of the two-point calibration determination as described in accordance with the preferred embodiment, however, eliminates the need for selected or expensive parts.

Figure 3:
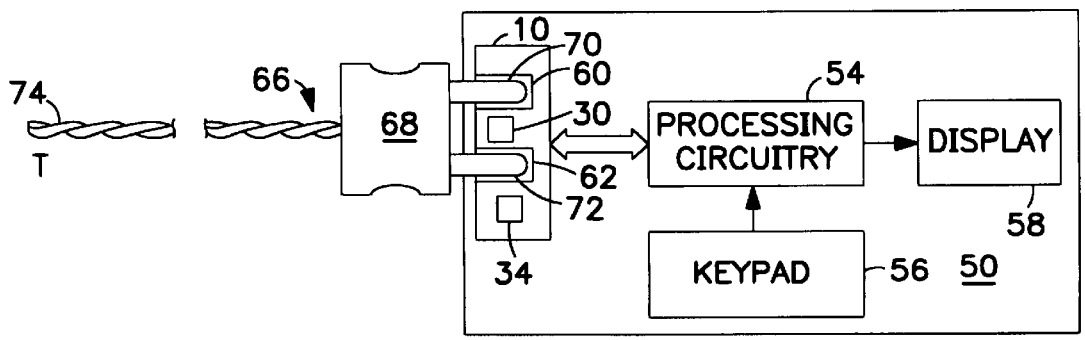
FIG. 3 is a diagram of a representative thermocouple thermometer having a calibrated isothermal assembly in accordance with the present invention.

In FIG. 3, there is shown a diagram of a representative thermocouple thermometer 50 having a calibrated isothermal assembly 10 as described in accordance with FIG. 1. Also included within thermometer 50 is processing circuitry 54, keypad 56, and display 58. Processing circuitry 54 may include conventional digital voltmeter processing circuits, and suitably may include an analog-to-digital converter and a microprocessor. Also included in the processing circuitry 54 may be conventional look-up tables or firmware containing curve-fitting algorithms to determine temperatures being measured for each thermocouple type to be used by the thermometer. Keypad 56 allows the user to select thermocouple types, temperature systems, operating modes, and measurement commands. Display 58 may suitably be a liquid crystal display (LCD) device for displaying measured temperatures in alpha-numeric characters.

The isothermal assembly 10 includes a pair of conductive contact pads 60 and 62, between which is mounted a temperature-sensing transistor 30. A typical thermocouple 66 with a plug 68 having a pair of blades 70 and 72 is shown in position on the isothermal assembly to aid in understanding the relationship of the thermocouple 66 to the thermometer 50. The contact pads 60 and 62 together respectively with thermocouple blades 70 and 72 form the reference junction 16–18 as described in connection with FIG. 1 to complete the thermocouple 66, permitting the temperature at measuring junction 74 to be measured by the thermometer 50. The whole point of the isothermal assembly is to ensure that contacts 60 and 62, as well as temperature sensing transistor 30, are all at the same temperature because it is the reference junction, as is well known in the art.

In operation, the processing circuitry 54 obtains the value of base-emitter voltage $V_{be}$ from the isothermal assembly 10 and uses such value to determine the reference junction temperature, which in turn is used to finally determine the temperature T at measuring junction 74 for a given thermocouple type in accordance with conventional lookup tables or mathematical algorithms. The measured value of temperature T is displayed by display device 58.

Figure 4:
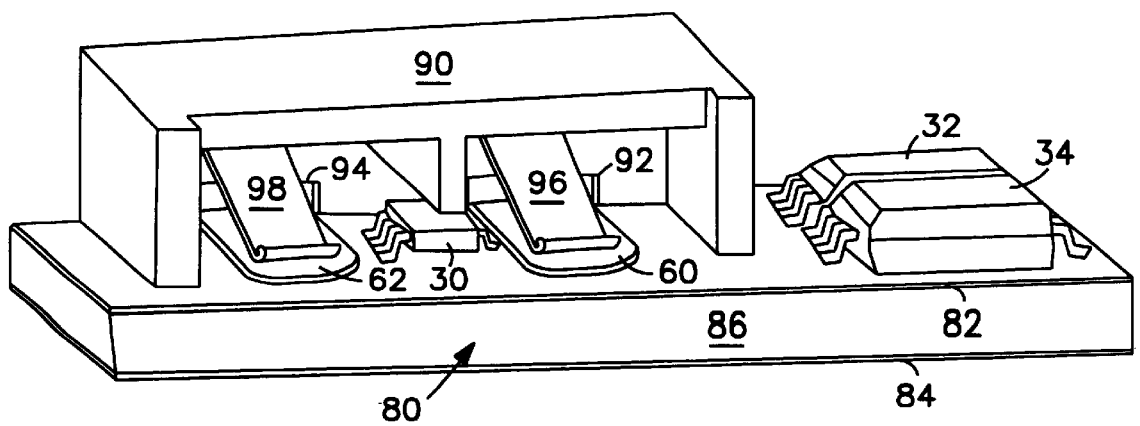
FIG. 4 shows a calibrated isothermal assembly in accordance with the present invention.

The isothermal assembly 10 is shown in greater detail in FIG. 4. An isothermal block 80 is the base member for the isothermal assembly and is fabricated on a specialized printed circuit board that includes a top insulative layer 82 and may further include a bottom insulative layer 84, and a metal plate 86 having good heat-conductive properties, such as copper or aluminum. The insulative layers 82 and 84 are relatively thin, e.g., 0.010 to 0.015 inch, while metal plate 86 is relatively thick, e.g., on the order of 0.040 to 0.125 inch, to establish sufficient thermal mass and good heat conductivity. The pair of conductive pads 60 and 62 are disposed in juxtaposition on the surface of top layer 82 of the isothermal block 10 for wiping engagement with the blades 70 and 72 of a thermocouple plug 68 as shown in FIG. 3. Temperature sensing transistor 30 is mounted on the surface of the top layer 82 of isothermal block 10 between the conductive pads 60 and 62. Because that metal plate 86 has excellent heat-conducting characteristics, conductive pads 60 and 62 are maintained at the same temperature because of the large thermal mass. Likewise, temperature sensing transistor 30 is also maintained at the temperature of the conductive pads 60 and 62, which, as stated previously, forms the virtual reference junction for the thermocouple. Also preferably mounted on the surface of the top layer 82 is current source 32 and memory device 34 containing calibration data as described earlier. Not shown for reasons of maintaining clarity are all of the circuit runs and connectors electrically interconnecting the electronic parts to each other and to the other circuits in the thermometer instrument 50. It can be discerned from the foregoing that a very compact isothermal block may be fabricated without the need for large ceramic parts to provide the needed thermal mass.

Figure 5:
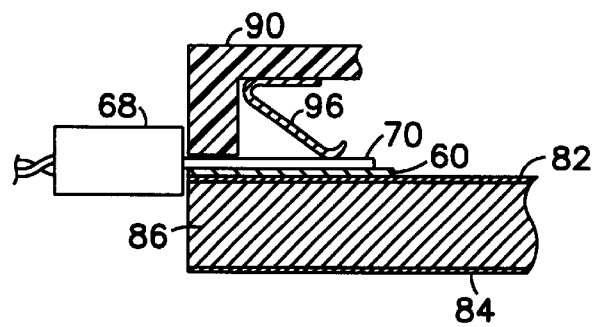
FIG. 5 shows a partial cross-section of the isothermal assembly with the thermocouple plug in position.

A housing 90 molded from a thermoplastic material is mounted on the surface of top layer 82, and provides a partial enclosure for the conductive pads 60 and 62 and temperature-sensing transistor 30, thus helping to maintain a stable ambient temperature above the isothermal block 80. Housing 90 may be integrally molded with a portion of the outer case of the thermometer instrument 50 to provide a plug-in area for the thermocouple 66. A pair of slots 92 and 94 receive the blades 70 and 72, respectively, of the thermocouple plug 68. A pair of spring clips 96 and 98 each have a free end in contact with the contact pads 60 and 62 when no thermocouple is plugged in, and provide wiping engagement with the blades 70 and 72 when the thermocouple is plugged in. This structure aids in maintaining thermal integrity of the isothermal assembly, and facilitates rapid stabilization of the temperature of blades 70 and 72 and isothermal block 80 when the thermocouple is plugged in. The relationship of these elements can be seen in the partial cross-section of the isothermal assembly of FIG. 5, which shows blade 70 in contact with contact pad 60, and held in position by the tension of spring clip 96.

As mentioned earlier, memory device 34 holds calibration data for temperature sensing transistor 30. Calibration of the isothermal assembly 10 may be achieved by bringing the assembly to a first predetermined temperature, such as 35° C., as discussed earlier. Due to good thermal conductivity of the assembly, the conductive pads 60 and 62, and temperature sensing transistor 30 are all quickly brought to the same temperature. The value of $V_{be}$ at that temperature is measured. Then the isothermal assembly is brought to a second known temperature, such as 15° C., and as soon as the assembly stabilizes at the new temperature, a second value of $V_{be}$ of the temperature sensing transistor 30 is measured.

Since an electronic assembly such as isothermal block 80 cannot be dropped in an ice bath for calibration, calibration in accordance with the preferred embodiment is carried out using a thermal air column into which several such assemblies may be placed at the same time, and air of known temperatures is passed over the assemblies to bring the assemblies to the desired temperatures. The isothermal block of the present invention is calibrated using a commercially-available Saunders & Associates 4220A Test Chamber and 2255 Controller. This unit permits up to 36 isothermal blocks to be calibrated at the same time. The isothermal blocks are mounted in drum fashion to permit the controller electronics to contact each block in turn as the drum rotates. During temperature application and voltage measurement, the thermal column containing the drum of isothermal blocks is sealed against outside ambient air temperature. Once the temperature stabilizes for any given application of temperature-controlled air, the controller part of the unit reads the output voltage $V_{be}$ of each temperature sensing transistor 30. As described in connection with FIG. 2, calibration data is developed and stored in the respective memory device 34 corresponding to each temperature sensing transistor 30. The entire calibration procedure using this commercially-available equipment is fully automated and takes about 25 minutes for a two-point procedure to provide stored calibration data for thirty-six isothermal blocks, most of which is waiting for temperatures to stabilize.

As mentioned earlier, calibration data may in the form of a single voltage $V_{be}$ and a known slope of the linear characteristic base-to-emitter voltage curve, or it may be voltages and temperatures obtained at the two points so that a linear characteristic curve may be reconstructed by the thermometer's processing circuitry. Again, as mentioned previously, the preferred embodiment uses the voltage $V_{be}$ corresponding to a known intermediate temperature and the slope determined from measuring two points as calibration data.

Once the calibrated isothermal assembly is installed in an instrument and the instrument becomes operational, the temperature sensing transistor 30 tracks the temperature of the isothermal assembly 10 over a range of operating temperatures specified for the instrument. When a thermocouple 66 is installed and a temperature measurement is made, the processing circuitry 54 measures a new value of transistor 30 $V_{be}$ and uses the calibration data stored in memory device 34 to determine the temperature of the isothermal block, and hence of the virtual reference junction. Once this information is derived, the temperature actually being measured at tip 74 of the thermocouple 66 may be determined in the conventional manner.

From the foregoing, it can be discerned that a thermocouple thermometer is provided with a compact calibrated isothermal assembly that allows the thermometer to be assembled without the need for a later, time-consuming temperature calibration step. Additionally, if the thermometer is a dual temperature-measuring instrument, a single isothermal block can be fabricated to accommodate two thermocouple plugs and thus keep the reference junctions at the same temperature.

While we have shown and described the preferred embodiment of our invention, it will be apparent to those skilled in the art that many changes and modifications may be made without departing from our invention in its broader aspects. It is therefore contemplated that the appended claims will cover all such changes and modifications as fall within the true scope of the invention.

What we claim as our invention is:

1. A calibrated isothermal assembly for a thermocouple thermometer, comprising:
    a base member comprising a metal plate having a high heat conductivity characteristic and sufficient thermal mass to provide an isothermal block, said metal plate having an electrical insulative layer disposed thereon;
    a pair of electrical contacts disposed on said electrical insulative layer and forming a virtual reference junction for a thermocouple;
    a temperature sensing transistor having a voltage-temperature characteristic curve mounted on said base member proximate said pair of electrical contacts; and
    a memory device mounted on said base member, said memory device containing calibration data relating to said voltage-temperature characteristic curve of said temperature sensing transistor.

2. A calibrated isothermal assembly in accordance with claim 1 further comprising a current source for said temperature sensing transistor mounted on said base member.

3. A calibrated isothermal assembly in accordance with claim 1 further comprising a housing mounted on said base member and extending over said pair of electrical contacts.

4. A calibrated isothermal assembly in accordance with claim 1 wherein said metal plate is composed of copper.

5. A calibrated isothermal assembly in accordance with claim 1 wherein said metal plate has a thickness of at least 0.040 inches.

6. A calibrated isothermal assembly in accordance with claim 1 wherein said calibration data includes at least one value of voltage corresponding to at least one predetermined temperature on said voltage-temperature characteristic curve of said temperature sensing transistor.

7. A compact isothermal assembly, comprising:
    a metal plate upon which is disposed at least one electrical insulative layer to form a specialized printed circuit board, said metal plate having sufficient thermal mass to provide an isothermal block;
    a pair of conductive pads disposed in juxtaposition on a surface of said at least one electrical insulative layer;
    a temperature sensing transistor having a voltage-temperature characteristic curve disposed on said surface in close proximity to said conductive pads;
    a memory device disposed on a surface of said at least one insulative layer, said memory device containing calibration data relating to said voltage-temperature characteristic curve of said temperature sensing transistor.

8. A compact isothermal assembly in accordance with claim 7 wherein said metal plate has a thickness of at least 0.040 inch.

9. A compact isothermal assembly in accordance with claim 7 wherein said metal plate is copper.

10. A compact isothermal assembly in accordance with claim 7 further comprising a housing mounted on said surface and at least partially enclosing said conductive pads and said temperature sensing transistor.

11. A compact isothermal assembly in accordance with claim 10 wherein a pair of spring clips are attached to said housing, said pair of spring clips each having a free end disposed adjacent a respective conductive pad.

* * * * *